US012729861B2

(12) United States Patent
Lee et al.

(10) Patent No.: US 12,729,861 B2
(45) Date of Patent: Sep. 8, 2026

(54) COOKING APPLIANCE

(71) Applicant: LG Electronics Inc., Seoul (KR)

(72) Inventors: Yong Hyun Lee, Seoul (KR); Kyoung-Joon Park, Seoul (KR); Jaekyung Yang, Seoul (KR); Sangcheol Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 376 days.

(21) Appl. No.: 18/287,569

(22) PCT Filed: Jun. 1, 2021

(86) PCT No.: PCT/KR2021/006771
§ 371 (c)(1),
(2) Date: Oct. 19, 2023

(87) PCT Pub. No.: WO2022/225092
PCT Pub. Date: Oct. 27, 2022

(65) Prior Publication Data
US 2024/0200787 A1 Jun. 20, 2024

(30) Foreign Application Priority Data
Apr. 20, 2021 (KR) ........................ 10-2021-0050979

(51) Int. Cl.
*F24C 15/00* (2006.01)
*F24C 7/08* (2006.01)
*G03B 17/55* (2021.01)
*G03B 30/00* (2021.01)

(52) U.S. Cl.
CPC ............ *F24C 15/006* (2013.01); *F24C 7/085* (2013.01); *G03B 17/55* (2013.01); *G03B 30/00* (2021.01)

(58) Field of Classification Search
CPC ........ F24C 15/006; F24C 7/085; G03B 30/00; G03B 17/55
USPC ........................................................ 126/21 A
See application file for complete search history.

(56) References Cited

U.S. PATENT DOCUMENTS

| | | | | |
|---|---|---|---|---|
| 9,982,895 | B2 | 5/2018 | Ruther | |
| 10,419,647 | B2 | 9/2019 | Park et al. | |
| 10,523,851 | B2 * | 12/2019 | Armstrong | F24C 15/024 |
| 10,794,599 | B2 | 10/2020 | Jang et al. | |
| 2014/0048055 | A1 | 2/2014 | Ruther | |
| 2017/0000292 | A1 | 1/2017 | Park et al. | |
| 2018/0058702 | A1 | 3/2018 | Jang et al. | |
| 2019/0260915 | A1 * | 8/2019 | Armstrong | H05B 6/6411 |
| 2020/0166276 | A1 | 5/2020 | Garuccio et al. | |
| 2020/0236743 | A1 | 7/2020 | Yang et al. | |

(Continued)

FOREIGN PATENT DOCUMENTS

| | | | |
|---|---|---|---|
| EP | 3 667 172 | A1 | 6/2020 |
| EP | 3 786 527 | A1 | 3/2021 |

(Continued)

*Primary Examiner* — Avinash A Savani
(74) *Attorney, Agent, or Firm* — Birch, Stewart, Kolasch & Birch, LLP

(57) ABSTRACT

A cooking appliance in which a plurality of transparent plates, which block heat generated in the cavity to protect a camera, are disposed not to be in direct contact with a camera module, and individual transparent plates are spaced apart from each other to form air layers so that the direct conduction of heat from the cavity to the camera can be prevented.

16 Claims, 8 Drawing Sheets

(56) References Cited

U.S. PATENT DOCUMENTS

| | | | |
|---|---|---|---|
| 2021/0003289 | A1 | 1/2021 | Iwamoto et al. |
| 2021/0018182 | A1 | 1/2021 | Jang et al. |
| 2021/0095864 | A1 | 4/2021 | Nakashima et al. |
| 2021/0144286 | A1 | 5/2021 | Jang et al. |

FOREIGN PATENT DOCUMENTS

| | | | |
|---|---|---|---|
| KR | 10-2018-0015926 | A | 2/2018 |
| KR | 10-2018-0025787 | A | 3/2018 |
| KR | 10-2018-0137999 | A | 12/2018 |
| WO | WO 2021/002670 | A1 | 1/2021 |

* cited by examiner

COOKING APPLIANCE

CROSS REFERENCE TO RELATED APPLICATIONS

This application is the National Phase of PCT/KR2021/006771 filed on Jun. 1, 2021, which claims priority under 35 U.S.C. § 119 (a) to Patent Application No. 10-2021-0050979 filed in the Republic of Korea on Apr. 20, 2021, all of which are hereby expressly incorporated by reference into the present application.

TECHNICAL FIELD

The present disclosure relates to a cooking appliance with a camera photographing the inside of a cooking compartment, and in particular, a cooking appliance that can effectively protect a camera from being thermally damaged by blocking the transfer of heat generated from a cooking compartment to the camera or by cooling the camera directly.

BACKGROUND ART

Cooking appliances are installed in the kitchen and used to cook food items as the user wants. Cooking appliances can fall into different categories, based on a heat source or the type of a cooking appliance, and the sort of fuel.

Cooking appliances can be categorized into open-type cooking appliances and sealed-type cooking appliances, depending on the shape of a space where a food item is placed. A sealed-type cooking appliance comprises an oven, a microwave oven and the like, and an open-type cooking appliance comprises a cooktop, a hob and the like.

In the sealed-type cooking appliance, a space in which a food item is placed is shielded, and the shielded space is heated to cook the food item.

The sealed-type cooking appliance is provided with a cooking compartment in which a food item is placed and which is shielded when a food item is cooked. The cooking compartment is a space in which a food item is substantially cooked. A heat source is provided inside or outside the cooking compartment, to heat the cooking compartment.

The sealed-type cooking appliance is rotatably provided with a door that selectively opens and closes the cooking compartment. The door is rotatably disposed at a main body by a door hinge that is provided between the main body having the cooking compartment therein and the door, and rotates around the portion where the door is coupled to the main body through the door hinge, to open and close the cooking compartment selectively. A heat source is provided in the inner space of the cooking compartment, which is opened and closed by the door, to heat the cooking compartment. The heat source can comprise a gas burner or an electric heater and the like.

In recent years, cooking appliances with a built-in camera photographing a cooking state of a food item being cooked in a cooking compartment of a sealed-type cooking appliance have been developed, to enable users to monitor the cooking state, through a display provided at the door of the cooking appliance or smart devices of the users, or allow users to remotely control the cooking appliance through smart devices, thereby enhancing user convenience.

The built-in camera needs to be disposed near the cooking compartment to photograph the inside of the cooking compartment. At this time, the camera is preferably disposed at the upper side of the cooking compartment, to photograph a cooking process intuitively.

However, in the case where heat in the cooking compartment is directly transferred to the camera in the cooking process, it is highly likely that the camera is damaged or causes operational errors.

Accordingly, suggested are technologies for blocking heat from being transferred to the camera or cooling the camera while the camera is disposed near the cooking compartment.

In relation to this, a configuration of a cooking appliance is disclosed in KR Patent Publication No. 10-2018-0025787, in which while a camera is disposed in the upper portion of a cooking compartment, to photograph the inside of the cooking compartment clearly, a structure for cooling the camera is included to prevent an increase in the temperature of the camera, caused by a transfer of heat generated in the cooking compartment.

The cooking appliance according to the above document is provided with a camera cooling fan that is disposed in the upper portion of the camera and directly cools the camera in a way that external air is suctioned and flows toward the camera.

However, in the cooking appliance of the above document, external air drawn into the cooling fan cools the camera while moving along the outer circumferential surface of the camera, but a glass and a bracket disposed in the lower portion of the camera cannot be cooled directly with the external air. Thus, heat generated in a cavity is conducted to the camera through the glass and the bracket, deteriorating the cooling effect of the cooling fan.

DESCRIPTION OF INVENTION

Technical Problems

The first objective of the present disclosure is to provide a cooking appliance in which a plurality of transparent plates blocks heat generated in the cavity, protects the camera, and is disposed not to contact a camera module directly, and the transparent plates are spaced from each other to form an air layer, to prevent direct conduction of heat from the cavity to the camera.

The second objective of the present disclosure is to provide a cooking appliance that promotes the effect of thermally insulating the camera by allowing external air to flow to the air layer formed between the plurality of transparent plates and the effect of cooling the camera by allowing a portion of the external air to flow to the camera.

Aspects according to the present disclosure are not limited to the above ones, and other aspects and advantages that are not mentioned above can be clearly understood from the following description and can be more clearly understood from the embodiments set forth herein. Additionally, the aspects and advantages in the present disclosure can be realized via means and combinations thereof that are described in the appended claims.

Technical Solutions

A cooking appliance in the present disclosure comprises a cavity a front surface of which is open and which has a cooking compartment therein, a camera that is disposed at an upper side of the cavity and photographs an inside of the cooking compartment, a first transparent plate that is disposed between the cavity and the camera, and a second transparent plate that is disposed between the first transparent plate and the cavity, wherein a first heat insulation air layer in which external air flows is formed between the first transparent plate and the second transparent plate. Thus, heat generated in the cavity is effectively prevented from being conducted directly to the camera through the transparent plate and a bracket, and the effect of thermally insulating the camera is additionally ensured by forcibly blowing external air to an air passage.

The cooking appliance may further comprise an air blowing fan that suctions the external air, and an air blowing duct that guides air suctioned through the air blowing fan to the first heat insulation air layer.

The air blowing duct may be provided with an inlet into which the external air is drawn, and an outlet through which the external air drawn is discharged, and the air blowing fan may be disposed near the inlet, in the air blowing duct.

The outlet comprises a first outlet through which a portion of the drawn air is discharged toward the air passage, and a second outlet through which the remaining portion of the drawn air is discharged toward the camera.

The cooking appliance may further comprise an installation plate that is spaced from the cavity while being disposed at the upper side of the cavity, and that allows the camera to be disposed on an upper surface thereof, and the first transparent plate may be disposed on a lower surface of the installation plate.

The cooking appliance may further comprise a bracket that is coupled to the lower surface of the installation plate, accommodates the first transparent plate, and is shaped into a box an upper surface of which is open, and the first heat insulation air layer may be formed between the bracket and the first transparent plate.

The second transparent plate may be disposed on a lower surface of the bracket, to face the first transparent plate.

The installation plate may be provided with an inhale hole into which air having passed through the outlet of the air blowing duct is drawn, and an exhaust hole through which air having been drawn from the inhale hole and having passed through the first heat insulation air layer is discharged.

The inhale hole and the exhaust hole may be formed to face each other with the first transparent plate therebetween.

The cooking appliance may further comprise an upper plate that is spaced from the cavity while being disposed at the upper side of the cavity and is provided with an electronic component compartment which is disposed on an upper surface of the cavity, near a front surface of the cavity, and the installation plate may be formed apart from the upper plate, and coupled to the upper plate.

The cooking appliance may further comprise a partition case that is disposed at the upper side of the cavity and forms an avoidance space for preventing interference with an external structure, and the partition case may be provided with an inflow opening which is formed in a position corresponding to a position of the inlet of the air blowing duct and through which the external air passes.

The cooking appliance may further comprise a third transparent plate that is disposed on an inner surface of an upper portion of the cavity, at a lower side of the second transparent plate, and a second heat insulation air layer may be formed between the second transparent plate and the third transparent plate.

The first transparent plate may be made of a material having lower heat resistance than the third transparent plate.

The first transparent plate may have a less thickness than the third transparent plate.

Advantageous Effects

The cooking appliance in the present disclosure comprises a plurality of transparent plates that blocks heat generated in the cavity, protects the camera, and is disposed not to contact a camera module directly, and the transparent plates are spaced from each other to form an air layer, to prevent direct conduction of heat from the cavity to the camera.

The cooking appliance in the present disclosure promotes the effect of thermally insulating the camera by allowing external air to flow to the air layer formed between the plurality of transparent plates and the effect of cooling the camera by allowing a portion of the external air to flow to the camera.

Specific effects are described along with the above-described effects in the section of detailed description.

DETAILED DESCRIPTION OF EXEMPLARY EMBODIMENTS

Figure 1:
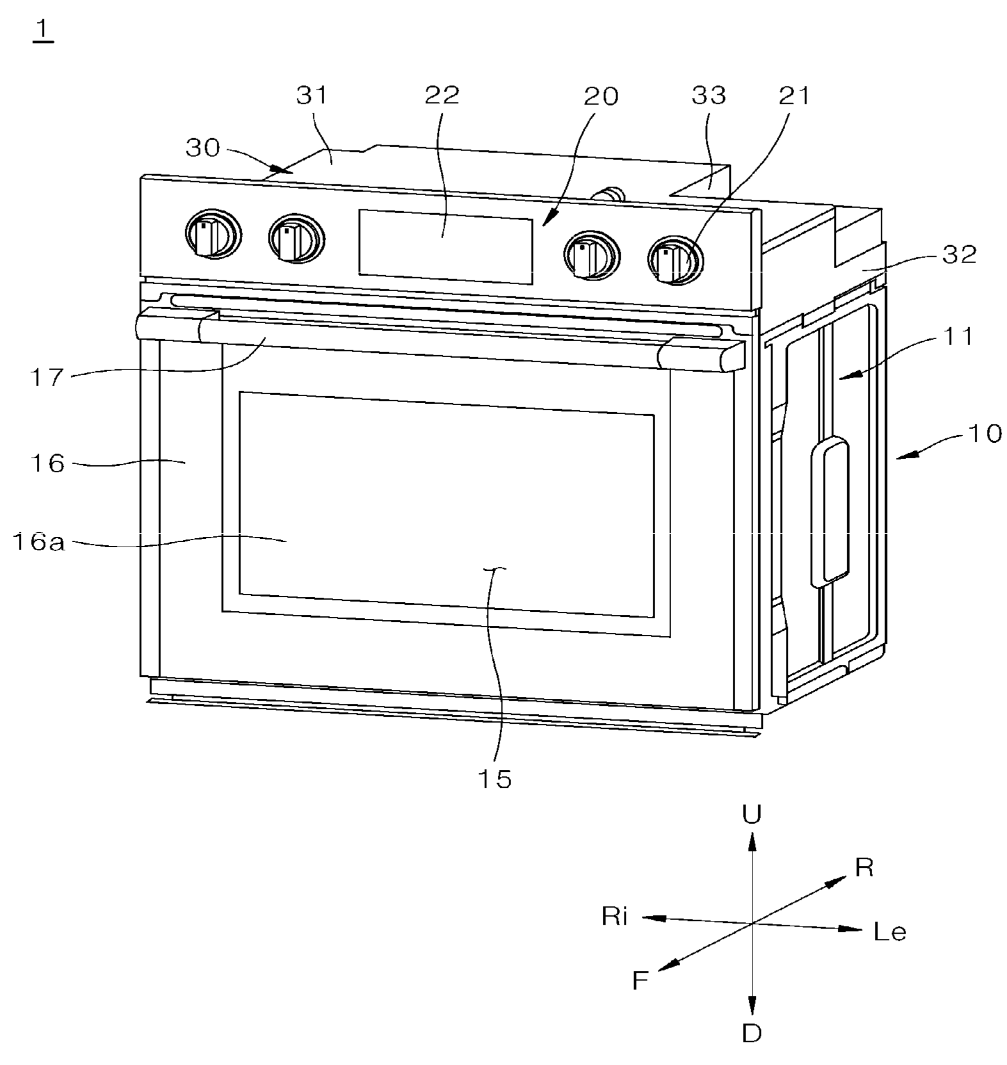
FIG. 1 is a front perspective view showing a cooling appliance in the present disclosure.

The above-described aspects, features and advantages are specifically described hereafter with reference to accompanying drawings such that one having ordinary skill in the art to which the subject matter of the present disclosure pertains can embody the technical spirit of the disclosure easily. In the disclosure, detailed description of known technologies in relation to the subject matter of the disclosure is omitted if it is deemed to make the gist of the disclosure unnecessarily vague. Hereafter, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components are not to be limited by the terms. Certainly, a first component can be a second component, unless stated to the contrary.

Throughout the disclosure, each component can be provided a single one or a plurality of ones, unless stated to the contrary.

When any one component is described as being "in the upper portion (or the lower portion)" or "on (or under)" another component, any one component can be directly on (or under) another component, and an additional component can be interposed between the two components.

When any one component is described as being "connected", "coupled" or "connected" to another component, any one component can be directly connected or coupled to another component, but an additional component can be "interposed" between the two components or the two components can be "connected", "coupled" or "connected" by an additional component.

In the disclosure, singular forms include plural forms as well, unless explicitly indicated otherwise. In the disclosure, the terms "being comprised of", "comprise", and the like do not imply necessarily including stated components or stated steps and imply excluding some of the stated components or stated steps or including additional components or additional steps.

In the disclosure, singular forms include plural forms as well, unless explicitly indicated otherwise. In the disclosure, the terms "being comprised of", "comprise", and the like do not imply necessarily including stated components or stated steps and imply excluding some of the stated components or stated steps or including additional components or additional steps.

Throughout the disclosure, the terms "A and/or B" as used herein can denote A, B or A and B, and the terms "C to D" can denote C or greater and D or less, unless stated to the contrary.

Hereafter, the cooking appliance 1 in the present disclosure is described with reference to the embodiments set forth herein.

First, an entire assembly structure constituting a cooking appliance 1 of one embodiment is schematically described with reference to FIGS. 1 to 3, and each assembly structure is schematically described.

[Entire Structure of Cooking Appliance 1]

Figure 2:
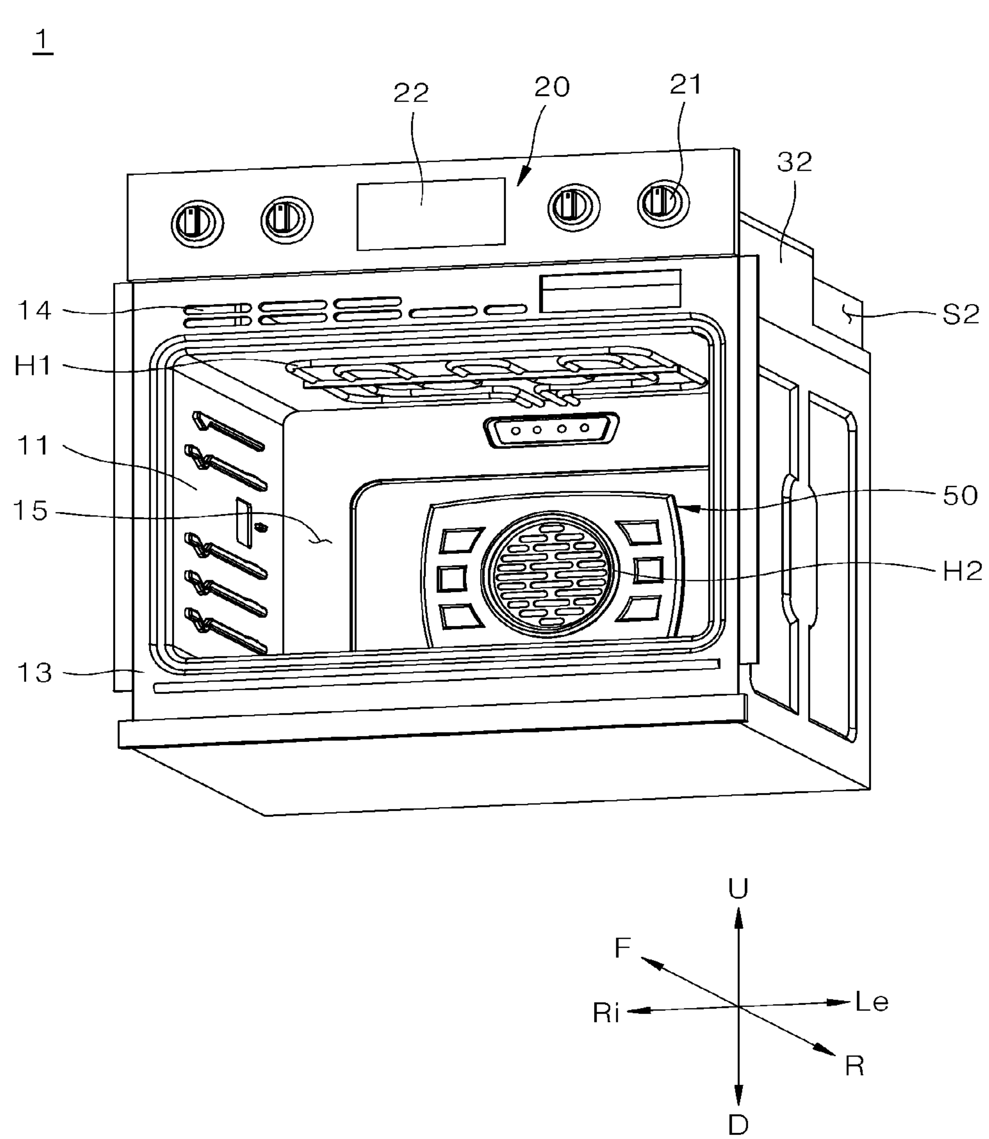
FIG. 2 is a front perspective view showing the cooking appliance in the present disclosure with its door open.

FIGS. 1 and 2 are perspective views showing a sealed-type cooking appliance 1 of one embodiment.

Referring to FIG. 1, the cooking appliance 1 may comprise a main body 10 forming the exterior of the cooking appliance 1.

The main body 10 may be provided in a shape comprising an approximately rectangular cuboid shape, and may be made of a material of predetermined strength to protect a plurality of components installed in the inner space of the main body 10.

The main body 10 may comprise a cavity 11 the front surface of which is open, and a front panel 13 which is disposed at the upper side of the front of the cavity 11.

The cavity 11 may have a cooking compartment 15 therein, and the front panel 13 may have an open part that opens the cooking compartment 15 forward.

The cooking compartment 15 provided in the cavity 11 of the main body 10 may be shaped into an approximate cuboid the front surface of which is open. As the inner space of the cooking compartment 15 is heated with the cooking compartment 15 closed, a food item in the cooking compartment 15 may be cooked. That is, the inner space of the cooking compartment 15 may be a space in which a food item is actually cooked, in the cooking appliance 1.

The cooking appliance 1 may be provided with a heating part that heats the cooking compartment 15. As an example of the heating part, an upper heater H1 heating the inner space of the cooking compartment 15 from above may be provided as a heating part, at the upper side of the cooking compartment 11, as illustrated in FIG. 2.

Additionally, a lower heater heating the inner space of the cooking compartment 15 from below may be provided as a heating part, at the lower side of the cooking compartment 15.

Further, a convection device H2 performing convection of hot air and heating the inner space of the cooking compartment 15 may be provided as a heating part, at the rear of the cooking compartment 15.

A temperature sensor may be attached to in the cavity 11, to measure the temperature of the cooking compartment 15 directly and indirectly.

A door 16 opening and closing the cooking compartment 15 selectively may be rotatably provided at the front of the main body 10. The door 16 may open and close the cooking compartment 15 in a pull-down manner, such that the upper end of the door 16 may rotate in an up-down direction (U-D direction) around the lower end of the door 16.

The door 16 may be entirely shaped into a cuboid having a predetermined thickness. A handle 17 may be provided on the front surface of the door 16, such that the user may grip the handle to rotate the door 16.

A control panel 20 may be provided in the upper portion of the front surface of the cooking appliance 1, i.e., on the front surface of the upper portion of the cavity 11. The control panel 20 may form a portion of the exterior of the front surface of the cooking appliance 1. The control panel 20 may be provided with a knob 21 for adjusting an operation of the cooking appliance 1, a panel display 22 displaying an operation state of the cooking appliance 1, and the like.

Additionally, a transparent glass or a door display 16*a* may be disposed on the font surface of the door 16. The door display 16*a* may receive an image signal from a camera 51 described below, and image and display a situation and state of cooking in the cooking compartment 15.

An electronic component compartment may be provided outside the cavity 11. For example, the electronic component compartment may be disposed in the upper portion of the cavity 11 and at the rear of the control panel 20.

At this time, the electronic component compartment may be formed on an upper plate 40 disposed at the upper side of the cavity 11, to protect a circuit board and electronic components from heat generated from the cavity. That is, the electronic component compartment may be disposed in an electronic component compartment installation space S1 formed at the front of the upper portion of the upper plate 40.

A space for installing a plurality of electronic components comprising a circuit board may be formed in the electronic component compartment.

A variety of elements, circuits and the like in relation to the receipt of a manipulation signal input through the control panel 20, the generation of a control signal for controlling an operation of the heating part, and the like may be provided on the circuit board. A configuration in relation to the accommodation and disposition of the circuit board and electronic components described above, which is publicly known in the art, may be applied. Accordingly, detailed description in relation to this is omitted.

The electronic component compartment may be shielded by the front panel 13, the upper plate 40 and an outer case 30. Specifically, the front surface of the electronic component compartment may be blocked by the front panel 13, the upper surface and the rear surface of the electronic component compartment may be blocked by an upper case 31 of the outer case 30, and the lateral surfaces of the electronic component compartment may be blocked by a side case 32 of the outer case 30. At this time, the lower surface of the electronic component compartment may be blocked by the upper plate 40.

The front panel 13 may be disposed between the cavity 11 and the door 16. The front panel 13 may be disposed to block the front of the electronic component compartment (not illustrated) at least partially.

Additionally, at least one inflow opening 14 may be provided on the front panel 13. The inflow opening 14 provided on the front panel 13 is referred to as a first inflow opening 14 such that the inflow opening 14 may distinguish from an inflow opening of external air for cooling the camera 51 or preventing heat transfer to the camera 51, as described hereafter. At this time, the inflow opening of external air for cooling the camera 51 or preventing heat transfer to the camera 51 may be referred to as a second inflow opening 33*h*.

As illustrated in FIG. 2, the first inflow opening 14 may be formed in a way that the first inflow opening 14 penetrates the front panel 13 in a front-rear direction (F-R direction). The first inflow opening 14 may form a passage allowing external air to flow into the electronic component compartment on the front panel 13.

As illustrated, a plurality of first inflow openings 14 may be provided in the left-right direction (Le-Ri direction) of the front panel 13 such that a main air current F1 may be formed entirely in the left-right direction (Le-Ri direction) with respect to the electronic component compartment installation space S1.

Figure 3:
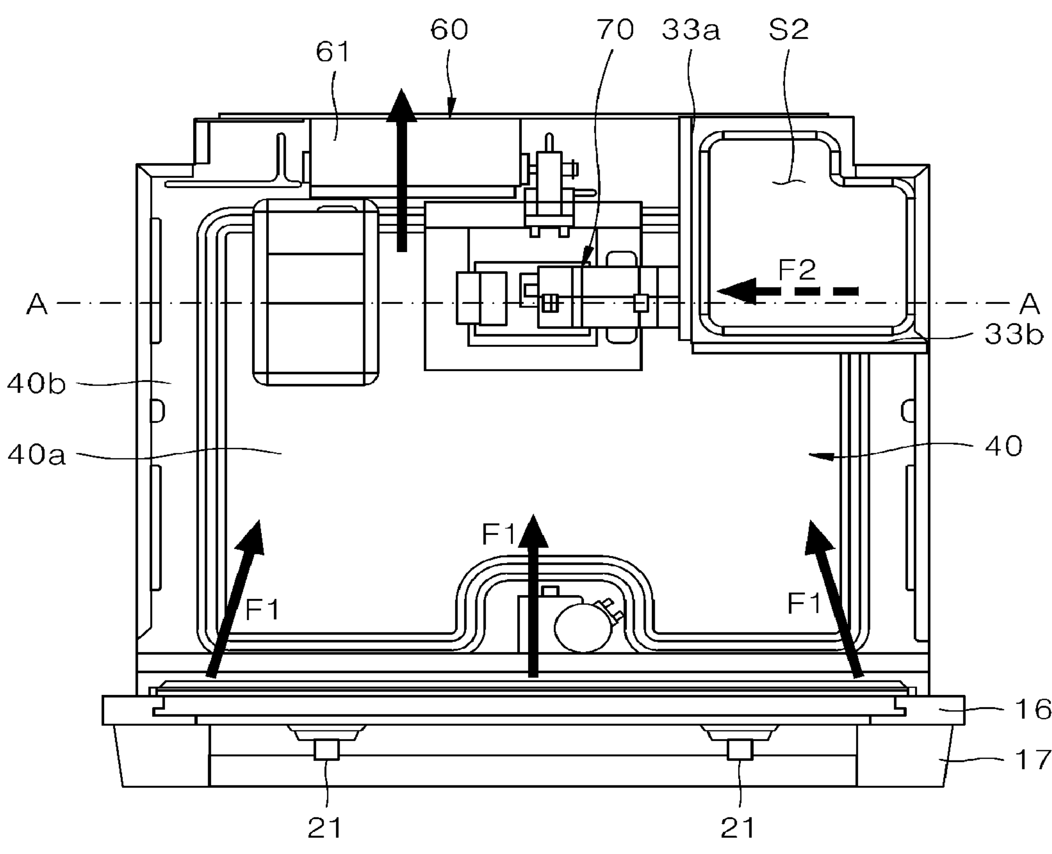
FIG. 3 is a plan view showing the cooking appliance in FIG. 1.
Figure 3:
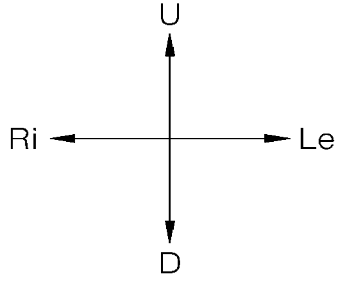

As illustrated in FIG. 3, air having passed through and flown into the first inflow opening 14 may form a main air current F1, and cool the circuit board and the plurality of electronic components disposed in the electronic component compartment, while passing the electronic component compartment installation space S1.

The upper surface of the cavity 11 may be comprised of a first area 11*a* and a second area 11*b*. The first area 11*a* corresponds to a portion being disposed approximately at the center of the upper surface of the cavity 11, and the second area 11*b* corresponds to a peripheral portion surrounding the first area 11*a*. The first area 11*a* may be disposed further upward than the second area 11*b*, and a step may be formed between the first area 11*a* disposed upward and the second area 11*b* disposed downward.

The upper plate 40 that is disposed at the upper side of the cavity 11 and has a shape corresponding to the shape of the upper surface of the cavity 11 is provided with a first area 40*a* and a second area 40*b*, like the upper surface of the cavity 11.

As illustrated, the electronic component compartment installation space S1 may be formed near the door 16, in the first area 11*a* of the cavity 11 and the first area 40*a* of the upper plate 40, such that a cooling effect is maintained at a maximum level with external cold air.

A main air current F1 drawn through the first inflow opening 14 moves rearward after cooling the circuit board and the like, while passing the electronic component compartment installation space S1.

An air blowing module 60 generating a main air flow F1 is disposed at the rear of the electronic component compartment installation space S1. As illustrated in FIG. 3, the air blowing module 60 may be disposed at the upper side of the second area 11*b* of the cavity 11 and at the upper side of the second area 40*b* of the upper plate 40, at the rear of the electronic component compartment installation space S1, for example.

The air blowing module generating a main air current F1 is hereafter referred to as a main air blowing module 60, such that the air blowing module may distinguish from a sub air blowing module 70 described below.

The main air current F1 escaping from the electronic component compartment installation space S1 may be suctioned by a main air blowing fan 61 of the main air blowing module 60, and discharged to the rear space of the cavity 11.

A centrifugal fan such as a sirocco fan and the like may be applied as the main air blowing fan 61, considering an air amount of the main air current F1 and an installation space of the main air blowing fan 61.

As the main air blowing fan 61 operates, external air flows into the electronic component compartment installation space S1 through the first inflow opening 14 penetrating the front panel 13. The air having flown into the electronic component compartment installation space S1 is suctioned toward the main air blowing fan 61, cools the electronic components disposed in the electronic component compartment 20, and is discharged to the rear space of the cavity 11 and then discharged to the front of the main body 10. At this time, the air suctioned into the main air blowing fan 61 may move through the camera module 50 disposed at the rear of the electronic component compartment installation space S1.

[Camera Module and Sub Air Blowing Module]

Hereafter, a camera module 50 and a sub air blowing module 70 in one embodiment are described with reference to FIGS. 4 to 8.

Figure 4:
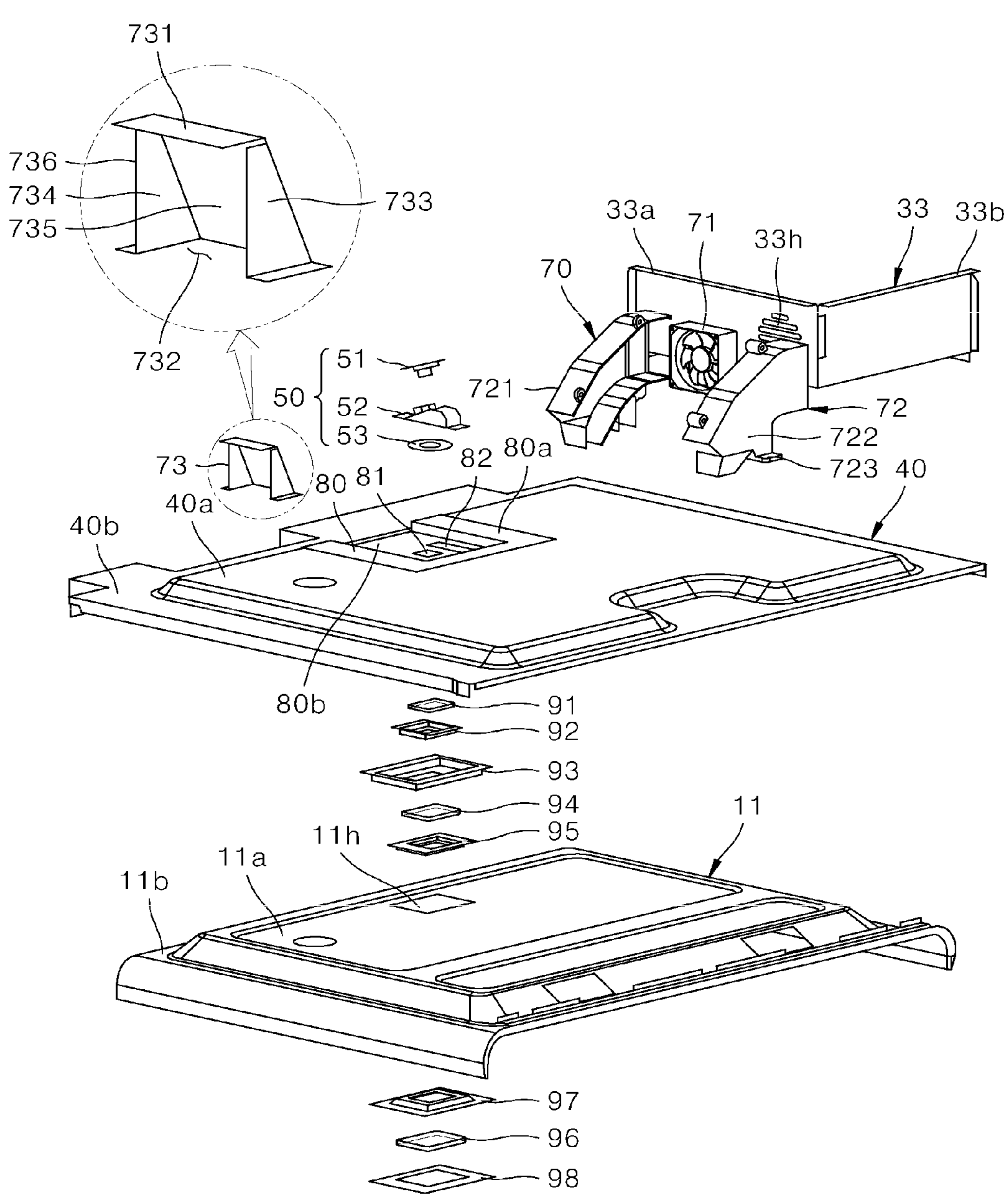
FIG. 4 is an exploded perspective view showing a camera module, a sub air blowing module and an upper place, among the components illustrated in FIG. 3.

As illustrated in FIG. 4, the cooking appliance 1 in the present disclosure may be provided with the camera module 50 that photographs the cooking compartment 15 in the cavity 11.

The camera module 50 comprises a camera 51 disposed at the upper side of the cavity 11. In particular, the camera 51 may be disposed at the rear of the electronic component compartment installation space S1, such that the camera 51 may avoid the upper heater H1 to prevent damage to the camera 15, caused by heat in the cooking compartment 15.

For example, an optical camera capturing an image in the visible light spectrum, the infrared radiation spectrum or the ultraviolet radiation spectrum may be provided as the camera 51, but the camera 51 may not be limited in the present disclosure. Any camera publicly known in the art may be applicable as long as the camera imagines a cooking state in the cooking compartment 15.

While cooking is performed in the cooking compartment 15, an image captured by the camera 51 may be transmitted to the above-described door display 16*a* or the smart device of the user, based on a wired or wireless method. Accordingly, the user may check a cooking process in the cooking compartment 15 accurately in real time.

The camera module 50 further comprises a camera holder 52 supporting the camera 51, and a rubber gasket 53 being provided between the camera holder 52 and the upper plate 40.

The camera holder 52 is fixed to the upper surface of the upper plate 40, and supports the camera 51 in the right position. The camera holder 152 may be manufactured based on plastic injection molding, considering plasticity for a slightly complex shape and resistance against heat transferred from the cavity 11.

As described above, the camera holder 52 may be fixed to the rear of the first area 40*a*, on the upper surface of the upper plate 40, considering the position of the camera 51 disposed at the rear of the electronic component compartment installation space S1.

However, the camera 51 and the camera holder 52 may be configured to be directly fixed to the upper plate 40. However, the camera 51 and the camera holder 52 may be indirectly fixed to the upper plate 40 through an installation plate 80 that is formed apart from the upper plate 40.

That is, during a manufacturing process, the camera module 50 and the sub air blowing module 70 described below may be fastened in advance to the installation pate 80 and modularized, and then assembled to the upper plate 40, to manufacture an entire cooking appliance 1. The camera module 50 and the sub air blowing module 70 are modularized in advance, as described above, simplifying the entire manufacturing process of the cooking appliance 1.

The camera 51 and the camera holder 52 are fixed to the installation plate 80 formed apart from the upper plate 40, in FIGS. 1 to 3, but not limited. The fixation of the camera module 50 to the installation plate 80 formed additionally is described.

The camera module 50 and the sub air blowing module 70 are fixed to the installation plate 80, and the installation plate 80 supports the camera module 50 and the sub air blowing module 70. To this end, the installation plate 80 may be formed in a way that a metal plate having predetermined strength and heat resistance is pressed.

The installation plate 80 is provided with an edge part 80*a* closely contacting and being coupled to the upper surface of the first area 40*a* of the upper plate 40. Preferably, the edge part 80*a* has a predetermined width or greater to maintain its coupling strength with the upper plate 40 at a predetermine level.

Additionally, the edge part 80*a* as shown in the embodiment may be formed at least on the front surface and both lateral surfaces of the installation plate 80.

The edge part 80*a* may have a bottom surface part 80*b* thereinside, and the bottom surface part 80*b* may be concave downward from the edge part 80*a*. As described above, the camera 51 and the camera holder 52 are fixed to the upper side of the bottom surface part 80*b*. To ensure a wide viewing angle in the cooking compartment 15 of the cavity 11, the edge part 80*a* is provided with the bottom surface part 80*b* having a concave shape, to enable the camera 51 to be installed close to the cavity 11 at a maximum level.

The bottom surface part 80*b* has a gasket hole 81, to allow the camera 51 to photograph the inside of the cooking compartment 15, and the installation hole 11*h* is provided on the upper surface of the cavity 11 under the gasket hole 81, to correspond to the gasket hole 81. As described below, a third transparent plate 96 is disposed at the installation hole 11*h*.

Additionally, an inhale hole 82 and an exhaust hole 83 are formed at the bottom surface part 80*b*. External air blown by the sub air blowing module 70 described below is drawn through the inhale hole 82, and the external air drawn is discharged through the exhaust hole 83. For example, the inhale hole 82 and the exhaust hole 83 may be disposed to face each other, with the gasket hole 81 therebetween.

Further, a rubber gasket 53 having a ring shape is provided between the gasket hole 81 formed at the installation plate 80 and the camera holder 52.

The ring-shaped rubber gasket 53 is disposed between the gasket hole 81 and the camera holder 52 and absorbs vibrations and impacts transferred through the installation plate 80. Also, the ring-shaped rubber gasket 53 may perform sealing and prevent the discharge of moisture or steam discharged from the cooking compartment 15. To this end, the rubber gasket 53 may be made of a rubber material having a predetermined elasticity.

The configurations of the camera holder 52 and the rubber gasket 53, which are publicly known in the art, are applicable. Detailed description in relation to this is omitted.

Further, the cooking appliance 1 in the present disclosure comprises a plurality of transparent plates being disposed between the cavity 11 under the camera 51 and the camera 51 and minimizing a transfer of heat generated from the cavity 11 to the camera 51.

In FIGS. 1 to 3, a first transparent plate 91, a second transparent plate 94 and a third transparent place 96 are disposed consecutively in a layer structure, for example, but not limited. An example provided with the first transparent plate 91, the second transparent plate 94 and the third transparent plate 96 is described, for example.

The first transparent plate 91 blocking the gasket 81 closely contacts and is fixed to the lower surface of the bottom surface part 80*b* of the installation plate 80. The first transparent plate 91 may have a greater size than the gasket hole 81, to entirely cover the gasket hole 81 from below.

The first transparent plate 91 is fixed to the lower surface of the bottom surface part 80*b* of the installation plate 80 through a first bracket 92. As the installation plate 80 is formed, the first bracket 92 may be formed in a way that a metal plate is pressed.

The first bracket 92 is provided with a bottom surface part that has a concave shape to accommodate the first transparent plate 91 entirely, and an edge part that extends outward from the bottom surface part. The edge part may be firmly fixed to the lower surface of the bottom surface part 80*b* of the installation plate 80 through a fastening means such as a bolt and the like, for example.

A penetration hole is formed at the bottom surface part of the first bracket 92, to ensure a visual field of the camera 91. The penetration hole of the first bracket 92 has a less size than the first transparent plate 91, to prevent the first transparent plate 91 from escaping.

Figure 7:
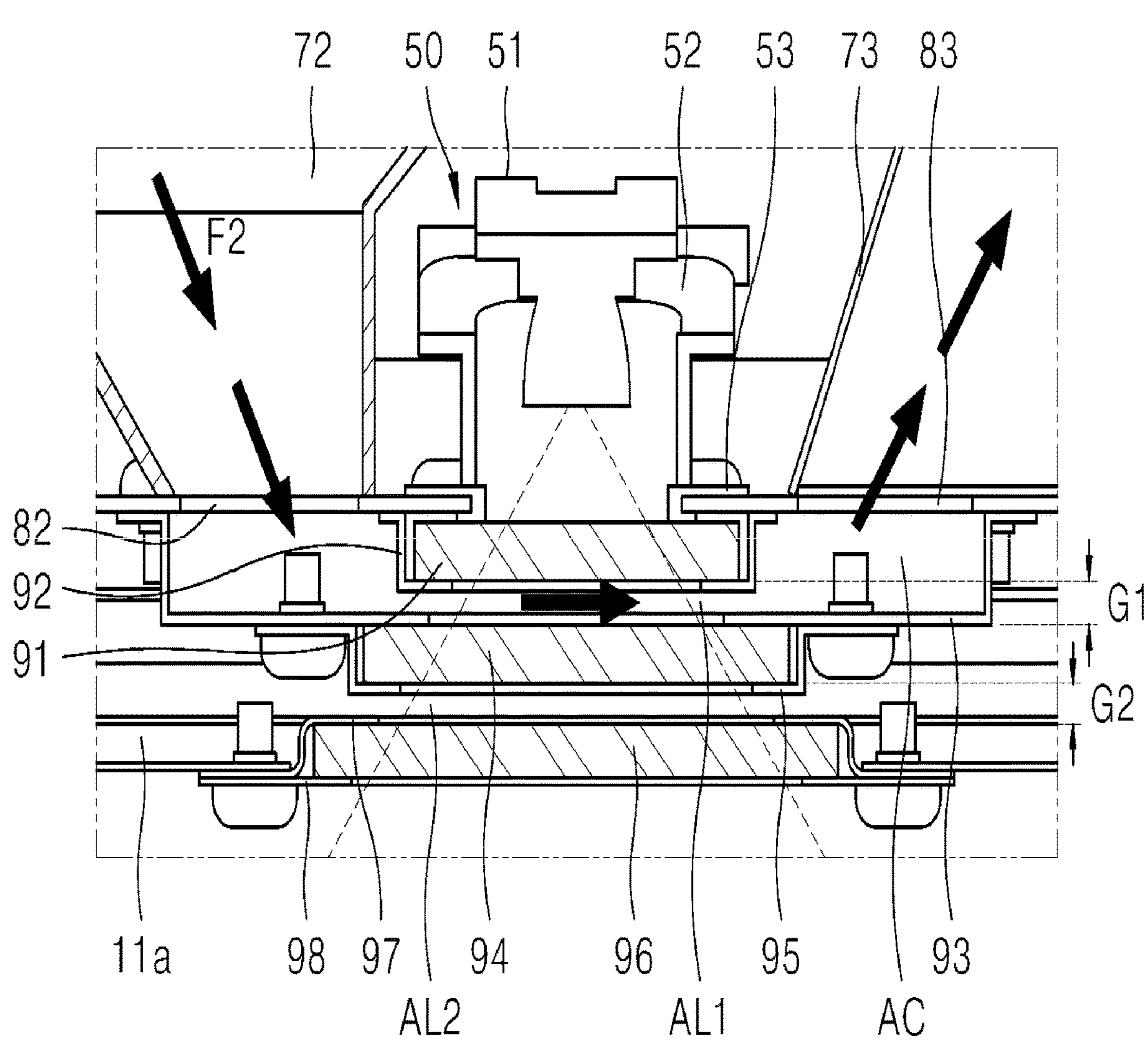
FIG. 7 is a partially enlarged view of FIG. 6.

The second transparent plate 94 is disposed under the first transparent plate. The second transparent plate 94 remains spaced from the first plate in the up-down direction (U-D direction), to prevent a heat transfer caused by contact through the second transparent plate 94. Preferably, the second transparent plate 94 remains spaced from the first plate by a first distance G1, as illustrated in FIG. 7.

To ensure a wide viewing angle of the camera 51, the second transparent plate 94 may be formed to have a greater size than the first transparent plate 91.

The second transparent plate 94 is fixed to the lower surface of the second bracket 93, to space the second transparent plate 94 from the first transparent plate 91 in a downward direction (D direction).

As illustrated in FIG. 4, like the installation plate 80, the second bracket 93 is provided with a bottom surface part having a downwardly concave shape, and the second transparent plate 94 is fixed to the lower surface of the bottom surface part. The first transparent plate 91 and the second transparent plate 94 remain spaced from each other by a first distance G1 by the second bracket 93 having a downwardly concave shape.

Accordingly, the first transparent plate 91 is entirely accommodated by the bottom surface of the second bracket 93. Further, the bottom surface part of the second bracket 93 is configured to cover the inhale hole 82 and the exhaust hole 83 of the installation plate 80 described above, at the same time.

Thus, a sealed space may be formed between the lower surface of the installation plate 80 and the bottom surface part of the second transparent plate 94, and as described below, may perform the functions of a first heat insulation air layer AL1 and an air passage AC at the same time.

A penetration hole is formed on the bottom surface part of the second bracket 93, to ensure a visual field of the camera 51. The penetration hole of the second bracket 93 has a less size than the second transparent plate 94, to prevent the second transparent plate 94 from escaping.

Like the first bracket 92 described above, the second transparent plate 94 may be firmly fixed to the lower surface of the second bracket 93, by a third bracket 95 accommodating the second transparent bracket entirely. The third bracket 95 and the first bracket 92 have a different size, but have a similar structure and are made of a similar material entirely. Accordingly, detailed description of the third bracket 95 may be omitted.

The third transparent plate 96 is disposed under the second transparent plate.

The third transparent plate 96 blocks the installation hole 11*h* formed on the upper surface of the cavity 11. For example, the third transparent plate 96 may be fixed to the installation hole 11*h* by a fourth bracket 97 supporting the third transparent plate 96 from above (a U direction) and a fifth bracket 98 supporting the third transparent plate 96 from below. Preferably, the third transparent plate 96 may be fixed to the installation hole 11*h* by a fastening means such as a bolt and the like, in the state of being inserted between the fourth bracket 97 and the fifth bracket 98.

Additionally, like the first transparent plate 91 and the second transparent plate 94, the second transparent plate 94 and the third transparent plate 96 remain spaced from each other, to prevent a transfer of heat generated in the cavity 11. Preferably, the second transparent plate 94 and the third transparent plate 96 may be spaced from each other by a second distance G2, as illustrated in FIG. 7. Accordingly, a second heat insulation air layer AL2 may be formed between the second transparent plate 94 and the third transparent plate 96.

To ensure a wide viewing angle of the camera 51, the third transparent plate 96 may have a greater size than the second transparent plate 94.

Preferably, the first to third transparent plates 91, 94, 96 have predetermined light transmittance, and are manufactured as plate-shaped glass having a thickness of 5 mm or so.

At this time, the first to third transparent plates 91, 94, 96 may be made of tempered glass or borosilicate glass exhibiting high heat resistance, to be prevented from being thermally damaged.

However, the amount of conducted heat of the first transparent plate 91 of the cooking appliance 1 in the present disclosure may decrease significantly, by the first heat insulation air layer AL1 and the second heat insulation air layer AL2.

Further, since external air is supplied to the first heat insulation air layer AL1 through the sub air blowing module 70 as described hereafter, the amount of heat transferred to the first transparent plate 91 may be much less than that of the second transparent plate 94 and the third transparent plate 96.

Accordingly, the first transparent plate 92 may be made of ordinary glass having low thermal resistance, rather than tempered glass or borosilicate glass. Further, the thickness of the first transparent plate 91 may be less than the thickness of the second transparent plate 94 and the thickness of the third transparent plate 96.

Thus, according to the present disclosure, manufacturing costs of the first transparent plate 91 may decrease, and the entire manufacturing costs of the cooking appliance 1 may decrease.

Additionally, the cooking appliance 1 in the present disclosure may comprise a sub air blowing module 70 that suctions external air and supplies the same to the first heat insulation air layer AL1 described above.

Since external air is supplied through the sub air blowing module 70, the first heat insulation air layer AL1 may function as an air passage AC through which external air flows.

The sub air blowing module 70 comprises a sub air blowing fan 71 that provides a suction force of suctioning external air. The type of the sub air blowing fan 71 is not limited, but for example, an axial flow fan may be applied as the sub air blowing fan 71 since the sub air blowing fan 71 blows less air than the main air blowing fan 61 but can be smaller than the main air blowing fan 61.

Further, the sub air blowing module 70 may further comprise an air blowing duct 72 guiding air suctioned through the sub air blowing fan 71 to the first heat insulation air layer AL1.

As described above, a main air current F1 having passed through the electronic component compartment installation space S1 is discharged to the rear of the main body 10 through the camera module 50. Accordingly, the main air current F1 passing through the camera module 50 has significantly higher temperature than external air.

In the case where the main air current F1 having a higher temperature than external air is drawn into the first heat insulation air layer AL1, the efficiency of thermally insulating and cooling the camera 51 may deteriorate.

Thus, the air blowing duct 72 may prevent the main air current F1 from being drawn to the first heat insulation air layer AL1, and form a sub air current F2 exclusive for cooling and thermally insulating the camera 51 and enhance the efficiency of cooling and thermal insulation.

To this end, an inlet 72*a* of the air blowing duct 72 directly connects to the second inflow opening 33*h*, and an outlet 72*b* of the air blowing duct 72 directly connects to the inhale hole 82 of the installation plate 80 described above.

The air lowing duct 72 may have an arch air channel therein, to connect the inhale hole 82 formed at the bottom surface part 80*b* of the installation plate 80, and the second inflow opening 33*h* formed in a higher position than the inhale hole 82.

At this time, to ensure ease of minimizing and modularizing the sub air blowing module 70, the sub air blowing fan 71 may be disposed, near the inlet 72*a* of the air blowing duct 72, in the air blowing duct 72.

Figure 5:
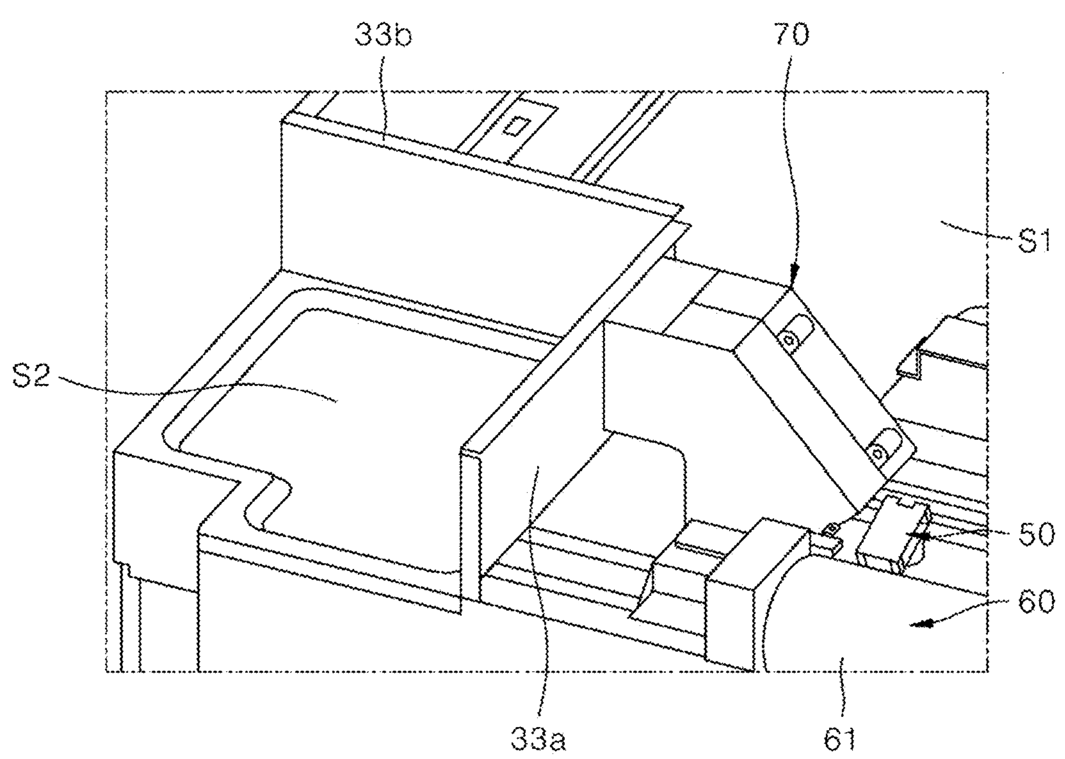
FIG. 5 is a partially enlarged view of FIG. 3.

In the embodiment of FIGS. 4 and 5, the second inflow opening 33*h* is formed at a first partition case 33*a*, which extends in the front-rear direction (F-R direction), of a partition case 33 forming an avoidance space S2 with respect to an external structure, for example, but not limited. The second inflow opening 33*h* may be formed in a variety of positions except for a position where the main air current F1 is drawn reversely. That is, the second inflow opening 33*h* may be formed at a second partition case 33*b*. At this time, depending on a position where the second inflow opening 33*h* is formed, the shape and size of the air blowing duct 72 may vary. Hereafter, the formation of the second inflow opening 33*h* at the first partition case 33*a* is described for convenience.

Considering plasticity for a slightly complex shape, the air blowing duct 72 may be manufactured in a way that a first body 721 and a second body 722 having an approximately symmetrical shape are coupled.

The first body 721 and the second body 722 may be manufactured respectively based on plastic injection molding.

The first body 721 and the second body 722 are respectively provided with a flange 723 for their fixation to the installation plate 80. The first body 721 and the second body 722 are provided with a penetration hole to be fixed to the installation plate 80, with a fastening means such as a bolt and the like. To enhance fastening strength, the flange 723 may extend in parallel with the . . . along the upper surface of the installation plate 80.

Additionally, the sub air blowing module 70 may further comprise an exhaust guide 73 that guides a flow direction of a sub air current F2 discharged through the exhaust hole 83 of the installation plate 80.

The main air current F1 has an air amount and a wind speed greater than those of the sub air current F2 formed in the first heat insulation air layer AL1. Accordingly, it is highly likely that a portion of the main air current F1 flows into the first heat insulation air layer AL1 through the exhaust hole 83 exposed to the main air current F1.

The exhaust guide 73 is disposed to surround the perimeter of the exhaust hole 83 of the installation plate 80, and prevents the inflow of the main air current F1 through the exhaust hole 83.

Specifically, the exhaust guide 73, as illustrated in FIG. 4, may have a vacant inside, and be shaped into a cuboid, an upper surface 731 of which has a less size than a lower surface 732. At this time, to minimize the inflow of the main air current F1, a front surface 733 and a rear surface 734 of the exhaust guide 73 are blocked.

Additionally, the lower surface 732 and a right surface 736 of the exhaust guide 73 are open to allow air being discharged through the exhaust hole 83 to flow, and a left surface 735 of the exhaust guide 73, facing the camera module 50, is closed.

At this time, the left surface 735 may be shaped into an inclined surface, to minimize resistance against air that moves upward while being discharged from the exhaust hole 83, and the generation of noise.

A flange-shaped fastening part extending in parallel with the installation plate 80 to be fastened to the installation plate 80 may be formed on the open lower surface 732.

Further, the sub air blowing module 70, as described above, together with the camera module 50, is fastened to the installation plate 80 in advance and modularized, and then assembled to the upper plate 40.

Specifically, the camera module 50 may be first assembled to the installation plate 80.

Then the first transparent plate 91 may be fastened to the bottom surface part 80*b* of the installation plate 80 through the first bracket 92, and the second transparent plate 94 may be fastened to the bottom surface part 80*b* of the installation plate 80 through the second bracket 93 and the third bracket 95.

The camera module 50, the first transparent plate 91 and the second transparent plate 94 are fastened as described above, and then the sub air blowing module 70 is fixed to the installation plate 80, to perform modularization.

For the cooking appliance 1 in the present disclosure, the camera module 50 and the sub air blowing module 70 are modularized in advance and then assembled to the upper plate 40, simplifying the entire manufacturing process of the cooking appliance 1.

[Air Blowing Process of Sub Air Blowing Module]

Hereafter, an air blowing process in which the sub air blowing module 70 thermally insulates and cools the camera 51 is described with reference to FIGS. 5 to 8.

Figure 6:
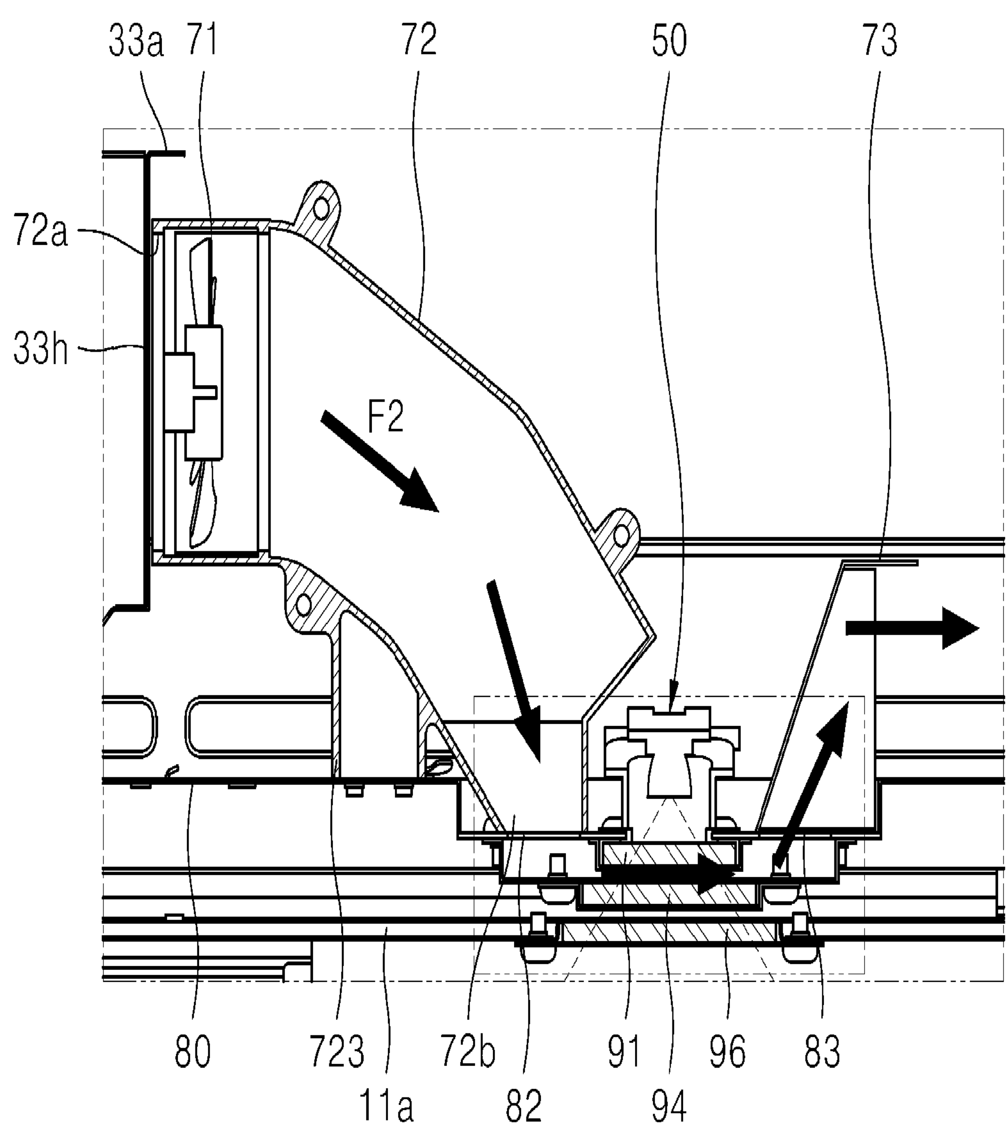
FIG. 6 is a perpendicular cross-sectional view cut along line A-A in FIG. 3.

Referring to FIGS. 6 and 7, the cooking appliance 1 in the present disclosure comprises the first to third transparent plates 91, 94, 96 that are spaced from one another and disposed in the up-down direction (U-D direction), the first heat insulation air layer AL1 that is formed between the first transparent plate and the second transparent plate 94, and the second heat insulation air layer AL2 that is formed between the second transparent plate 94 and the third transparent plate 96, as described above.

Accordingly, an amount of heat transferred from the cavity 11 to the camera 51 may decrease significantly, and heat insulation performance may improve significantly. Thus, in the case where the temperature of the cooking compartment 15 in the cavity 11 remains at a predetermined level or below, the camera 51 may be prevented from being damaged thermally, and power consumption may decrease with no need to operate the sub air blowing fan 71.

In the cooking appliance 1 of the present disclosure, in the case where the temperature in the cooking compartment 15 exceeds a predetermined temperature or in the case where the cooking appliance 1 operates in a cooking mode (a high-temperature cooking mode) where the temperature in the cooking compartment 15 is expected to exceed the predetermined temperature, the cooking appliance 1 operates the sub air blowing fan 71 to produce the effect of thermally insulating the camera 51. For example, the predetermined temperature may be 246° C.

As illustrated in FIGS. 6 and 7, the sub air blowing fan 71 may operate in the case where the temperature in the cooking compartment 15 exceeds the predetermined temperature or in the case where the cooking appliance 1 operates in the high-temperature cooking mode.

As the sub air blowing fan 71 starts to operate, external air is suctioned through the second inflow opening 33*h* formed at the first partition case 33*a*.

The external air suctioned and discharged through the sub air blowing fan 71 is supplied to the inhale hole 82 of the installation plate 80 through the air blowing duct 72, while forming a sub air current F2, and flows into the first heat insulation air layer AL1 through the inhale hole 82.

At this time, the sub air current F2 drawn through the inhale hole 82 flows into the air passage AC formed between the second bracket 93 and the installation plate 80.

The air drawn into the air passage AC moves through the first heat insulation air layer AL1 between the first transparent plate 91 and the second transparent plate 94, and the sub air current F2 flows while absorbing heat transferred from the second transparent plate 94 to the first transparent plate 91. That is, air flowing in the first heat insulation air layer AL1 produces a so-called air curtain effect, maximizing a heat insulation effect between the first transparent plate 91 and the second transparent plate 94.

Additionally, the air having passed through the first heat insulation air layer AL1 is discharged to the upper side of the upper plate 40 through the exhaust hole 83 of the installation plate 80, and combines with the main air current F1 and moves to the rear of the cavity 11, and finally, is discharged out of the cooking appliance 1.

In FIGS. 6 and 7, the sub air current F2 generated by the sub air blowing fan 71 is entirely drawn to the air passage AC, for example. However, at least a portion of the sub air current F2 generated by the sub air blowing fan 71 may also cool the camera 51 directly.

Figure 8:
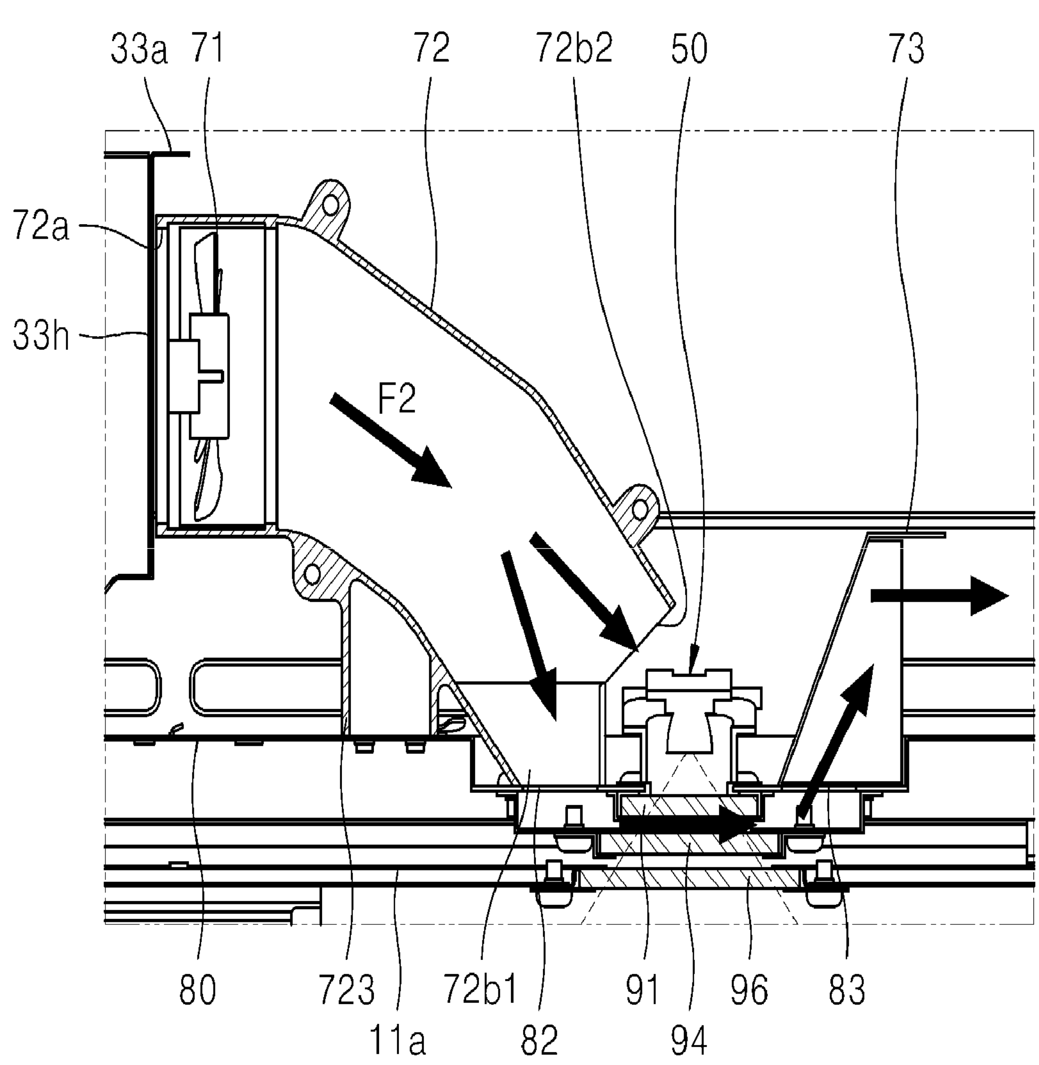
FIG. 8 is a perpendicular cross-sectional view showing an embodiment where some of the components in FIG. 6 change.

In FIG. 8, at least a portion of the sub air current F2 cools the camera 51 directly, for example.

Referring to FIG. 8, the air blowing duct 72 may be provided with a first outlet 72*b*1 and a second outlet 72*b*2 as two outlets, unlike the air blowing duct 72 illustrated in FIGS. 6 and 7.

As shown in the embodiment of FIGS. 6 and 7, the first outlet 72*b*1 connects to the inhale hole 82 of the installation plate 80, and the sub air current F2 discharged through the first outlet 72*b*1 is drawn into the first heat insulation air layer AL1 through the inhale hole 82.

The second outlet 72*b*2 may be formed in a position where the second outlet 72*b*2 is disposed higher than the first outlet 72*b*1 and orients the camera 51.

Accordingly, a portion of the sub air current F2 formed by the sub air blowing fan 71 is discharged through the first outlet 72*b*1, and then drawn to the first heat insulation air layer AL1, and the remaining portion of the sub air current F2 is discharged toward the camera 51 and cools the camera 51 directly.

The above-described embodiment is appropriate in the case where the cooking appliance 1 operates in a self-cleaning mode of a range of temperatures greater than the predetermined temperature described above, or in the case where a heater generating a greater amount of heat is applied.

That is, the camera 51 may be cooled directly, only by drawing the sub air current F2 through a higher first heat insulation air layer AL1 and promoting a heat insulation effect, at a time when the camera 51 cannot be sufficiently protected, preventing the camera 51 from being thermally damaged and improving the reliability of the camera 51.

The embodiments are described above with reference to a number of illustrative embodiments thereof. However, embodiments are not limited to the embodiments and drawings set forth herein, and numerous other modifications and embodiments can be drawn by one skilled in the art within the technical scope of the disclosure. Further, the effects and predictable effects based on the configurations in the disclosure are to be included within the range of the disclosure though not explicitly described in the description of the embodiment.

The invention claimed is:

1. A cooking appliance, comprising:
- a cavity including:
  - an opened front surface; and
  - a cooking compartment;
- a camera disposed at an upper side of the cavity, the camera being configured to capture an image of inside of the cooking compartment;
- a first transparent plate disposed between the cavity and the camera;
- a second transparent plate disposed between the first transparent plate and the cavity;
- an air blowing fan configured to suction external air; and
- an air blowing duct configured to guide the air suctioned through the air blowing fan to a first heat insulation air layer, in which the external air flows, the first heat insulation air layer being formed between the first transparent plate and the second transparent plate,
- wherein the air blowing duct includes:
  - an inlet into which the external air is drawn; and
  - an outlet through which the external air drawn is discharged, and
- wherein the outlet includes:
  - a first outlet through which a portion of the drawn air is discharged toward the first heat insulation air layer; and
  - a second outlet through which a remaining portion of the drawn air is discharged toward the camera.

2. The cooking appliance of claim 1,
wherein the air blowing fan is disposed near the inlet, in the air blowing duct.

3. The cooking appliance of claim 2, further comprising an installation plate spaced from the cavity and disposed at the upper side of the cavity, the camera being fixed to an upper surface of the installation plate,
wherein the first transparent plate is disposed on a lower surface of the installation plate, the lower surface of the installation plate being opposite to the upper surface of the installation plate.

4. The cooking appliance of claim 3, further comprising a bracket coupled to the lower surface of the installation plate, the bracket accommodating the first transparent plate and having a box shape with an opened upper surface,
wherein the first heat insulation air layer is formed between the bracket and the first transparent plate.

5. The cooking appliance of claim 4, wherein the second transparent plate is disposed on a lower surface of the bracket, and
wherein the second transparent plate faces the first transparent plate.

6. The cooking appliance of claim 4, wherein the installation plate includes:
- an intake hole into which air having passed through the outlet of the air blowing duct is drawn; and
- an exhaust hole through which air having been drawn from the intake hole and having passed through the first heat insulation air layer is discharged.

7. The cooking appliance of claim 6, wherein the intake hole and the exhaust hole face each other, and
wherein the first transparent plate is positioned between the intake hole and the exhaust hole.

8. The cooking appliance of claim 3, further comprising an upper plate spaced from the cavity and disposed at the upper side of the cavity, the upper plate being provided with an electronic component compartment,
wherein the installation plate is separate from the upper plate and is coupled to the upper plate.

9. The cooking appliance of claim 2, further comprising a partition case disposed at the upper side of the cavity, the partition case forming an avoidance space for preventing interference with an external structure,
wherein the partition case includes an inflow opening formed in a position corresponding to a position of the inlet of the air blowing duct, the external air passing through the inflow opening.

10. The cooking appliance of claim 1, further comprising a third transparent plate disposed on an inner surface of an upper portion of the cavity, the third transparent plate being disposed at a lower surface of the second transparent plate,
wherein a second heat insulation air layer is formed between the second transparent plate and the third transparent plate.

11. The cooking appliance of claim 10, wherein the first transparent plate is made of a material having lower heat resistance than the third transparent plate.

12. The cooking appliance of claim 10, wherein a thickness of the first transparent plate is less than a thickness of the third transparent plate.

13. A cooking appliance, comprising:

a cavity including a cooking compartment, the cooking compartment including a heater;

an upper plate disposed above the cavity;

a camera disposed on the upper plate, the camera being configured to capture an image of an inside of the cooking compartment and to transmit the image to a smart device of a user;

a sub air blowing module disposed on the upper plate, the sub air blowing module including a sub air blowing fan for flowing external air to the camera;

a first transparent plate disposed between the cavity and the upper plate;

a second transparent plate disposed between the first transparent plate and the cavity; and an installation plate having an edge part coupled to an upper surface of the upper plate, the camera being fixed to an upper surface of the installation plate, wherein a first heat insulation air layer, in which the external air flows, is formed between the first transparent plate and the second transparent plate, and wherein the first transparent plate is disposed on a lower surface of the installation plate, the lower surface of the installation plate being opposite to an upper surface of the installation plate.

14. The cooking appliance of claim 13, further comprising a third transparent plate disposed on an inner surface of an upper portion of the cavity, the third transparent plate being disposed at a lower surface of the second transparent plate, and wherein a second heat insulation air layer is formed between the second transparent plate and the third transparent plate.

15. The cooking appliance of claim 13, wherein the sub air blowing module further includes an air blowing duct configured to guide air suctioned through the sub air blowing fan to the first heat insulation air layer.

16. The cooking appliance of claim 13, wherein the installation plate further includes:

an intake hole into which air having passed through an outlet of an air blowing duct of the sub air blowing module is drawn; and an exhaust hole through which air having been drawn from the intake hole and having passed through the first heat insulation air layer is discharged.

* * * * *